(12) United States Patent
Tan et al.

(10) Patent No.: US 7,653,777 B2
(45) Date of Patent: Jan. 26, 2010

(54) PORTABLE DATA STORAGE DEVICE USING A MEMORY ADDRESS MAPPING TABLE

(75) Inventors: Henry Tan, Singapore (SG); Teng Pin Poo, Singapore (SG); Lay Chuan Lim, Singapore (SG)

(73) Assignee: Trek Technology (Singapore) Pte Ltd., Singapore (SG)

( * ) Notice: Subject to any disclaimer, the term of this patent is extended or adjusted under 35 U.S.C. 154(b) by 288 days.

(21) Appl. No.: 10/586,549

(22) PCT Filed: Jan. 19, 2004

(86) PCT No.: PCT/SG2004/000017

§ 371 (c)(1),
(2), (4) Date: Jul. 19, 2006

(87) PCT Pub. No.: WO2005/069288

PCT Pub. Date: Jul. 28, 2005

(65) Prior Publication Data

US 2008/0228995 A1 Sep. 18, 2008

(51) Int. Cl.
*G06F 12/02* (2006.01)
(52) U.S. Cl. .................. 711/103; 711/102; 711/165
(58) Field of Classification Search .......... 711/103, 711/102, 165
See application file for complete search history.

(56) References Cited

U.S. PATENT DOCUMENTS

| 5,404,485 | A | * | 4/1995 | Ban ........................ 711/202 |
| 5,918,055 | A | * | 6/1999 | Crawford et al. ............ 710/240 |
| 6,145,051 | A | | 11/2000 | Estakhri et al. ............. 711/103 |
| 6,347,355 | B1 | | 2/2002 | Kondo |
| 7,039,775 | B2 | | 5/2006 | Saito |
| 2002/0120820 | A1 | * | 8/2002 | Higuchi et al. ............. 711/154 |
| 2003/0123287 | A1 | | 7/2003 | Gorobets ................ 365/185.11 |
| 2003/0217206 | A1 | | 11/2003 | Poo ............................ 710/68 |
| 2005/0050273 | A1 | * | 3/2005 | Horn et al. ................. 711/114 |

FOREIGN PATENT DOCUMENTS

| JP | 2000-227871 | 8/2000 |
| JP | 2002-366420 | 12/2002 |

OTHER PUBLICATIONS

Chinese Search Report dated Jan. 10, 2006 and English translation thereof.

(Continued)

*Primary Examiner*—Sanjiv Shah
*Assistant Examiner*—Jae U Yu
(74) *Attorney, Agent, or Firm*—Ostrolenk Faber LLP

(57) ABSTRACT

A portable data storage device includes a USB controller, a master control unit and a NAND flash memory device. The master control unit receives data to be written to logical addresses, and instructions to read data from logical addresses. It uses a memory address mapping table to associate the logical addresses with the physical addresses in the memory device, and writes data to or reads data from the physical address corresponding to the logical address. The mapping is changed at intervals, so that different ones of the physical address regions are associated at different times with the logical addresses. This increases the speed of the device, and also means that no physical addresses are rapidly worn out by being permanently associated with logical addresses to which data is written relatively often.

20 Claims, 11 Drawing Sheets

FOREIGN PATENT DOCUMENTS

| | | |
|---|---|---|
| JP | 2003-058417 | 2/2003 |
| TW | 264547 | 5/1994 |
| WO | WO 01/61692 A1 | 8/2001 |
| WO | WO 03/003282 A1 | 1/2003 |

OTHER PUBLICATIONS

International Search Report PCT/SG2004/000017 dated Sep. 17, 2004, (Austrian Patent Office).

* cited by examiner

| | |
|---|---|
| 0 | 2 |
| 1 | 4 |
| 2 | 8 |
| 3 | 11 |
| 4 | 1 |
| 5 | 14 |
| 6 | 5 |
| 7 | 9 |
| | 3 |
| | 15 |
| | 16 |
| | 10 |

| | 9 |
| --- | --- |
| | 17 |
| | 18 |
| | 27 |

FIG. 6(b)

| 31 | 33 | 37 | 38 |
| --- | --- | --- | --- |
| 0 | 2 | | |
| 1 | 8 | | |
| 2 | 3 | ✓ | 0 |
| 3 | 9 | | |
| 4 | 1 | | |
| 5 | 6 | | |
| 6 | 10 | | |
| 7 | 11 | | |
| | 7 | ✓ | 2 |
| | 4 | | |
| | 5 | ✓ | 1 |
| | 12 | | |

(35 denotes the lower block)

FIG. 6(c)

| 8 | 59 | 10 | 11 |
| --- | --- | --- | --- |
| 16 | 58 | 57 | 19 |
| 24 | 25 | 26 | 56 |

(39)

|  | 0 | 1 | 2 | 3 | 4 | 5 | 6 | 7 |  |  |  |  | ... | 63 |
|---|---|---|---|---|---|---|---|---|---|---|---|---|---|---|
| BLOCK 0 | X | X | X | X | Y | Z | Z | Z | O | O | O | O | ... | O |
| BLOCK 1 |  |  |  |  |  |  |  |  |  |  |  |  | ... |  |
| BLOCK 2 |  |  |  |  |  |  |  |  |  |  |  |  | ... |  |
| BLOCK 3 | O | O | O | O | O | O | O | O | O | O | O | O | ... | O |
| BLOCK 4 |  |  |  |  |  |  |  |  |  |  |  |  |  |  |

FIG. 7(a)

|  | 0 | 1 | 2 | 3 | 4 | 5 | 6 | 7 |  |  |  |  | ... | 63 |
|---|---|---|---|---|---|---|---|---|---|---|---|---|---|---|
| BLOCK 0 | O | O | O | O | O | O | O | O | O | O | O | O | ... | O |
| BLOCK 1 |  |  |  |  |  |  |  |  |  |  |  |  | ... |  |
| BLOCK 2 |  |  |  |  |  |  |  |  |  |  |  |  | ... |  |
| BLOCK 3 | X | X | X | X | A | Z | Z | Z | O | O | O | O | ... | O |
| BLOCK 4 |  |  |  |  |  |  |  |  |  |  |  |  |  |  |

FIG. 7(b)

|  | 0 | 1 | 2 | 3 | 4 | 5 | 6 | 7 |  |  |  |  | ... | 63 |
|---|---|---|---|---|---|---|---|---|---|---|---|---|---|---|
| BLOCK 0 | X | X | X | X | Y | Z | Z | Z | O | O | O | O | ... | O |
| BLOCK 1 |  |  |  |  |  |  |  |  |  |  |  |  | ... |  |
| BLOCK 2 |  |  |  |  |  |  |  |  |  |  |  |  | ... |  |
| BLOCK 3 | X | X | X | X | A | O | O | O | O | O | O | O | ... | O |
| BLOCK 4 |  |  |  |  |  |  |  |  |  |  |  |  |  |  |

FIG. 7(c)

|  | 0 | 1 | 2 | 3 | 4 | 5 | 6 | 7 |  |  |  |  | ... | 63 |
|---|---|---|---|---|---|---|---|---|---|---|---|---|---|---|
| BLOCK 0 | X | X | X | X | Y | Z | Z | Z | O | O | O | O | ... | O |
| BLOCK 1 |  |  |  |  |  |  |  |  |  |  |  |  | ... |  |
| BLOCK 2 |  |  |  |  |  |  |  |  |  |  |  |  | ... |  |
| BLOCK 3 | X | X | X | X | A | B | O | O | O | O | O | O | ... | O |
| BLOCK 4 |  |  |  |  |  |  |  |  |  |  |  |  |  |  |

FIG. 7(d)

|  | 0 | 1 | 2 | 3 | 4 | 5 | 6 | 7 |  |  |  |  | ... | 63 |
|---|---|---|---|---|---|---|---|---|---|---|---|---|---|---|
| BLOCK 0 | O | O | O | O | O | O | O | O | O | O | O | O | ... | O |
| BLOCK 1 |  |  |  |  |  |  |  |  |  |  |  |  | ... |  |
| BLOCK 2 |  |  |  |  |  |  |  |  |  |  |  |  | ... |  |
| BLOCK 3 | X | X | X | X | A | B | Z | Z | O | O | O | O | ... | O |
| BLOCK 4 |  |  |  |  |  |  |  |  |  |  |  |  |  |  |

FIG. 7(e)

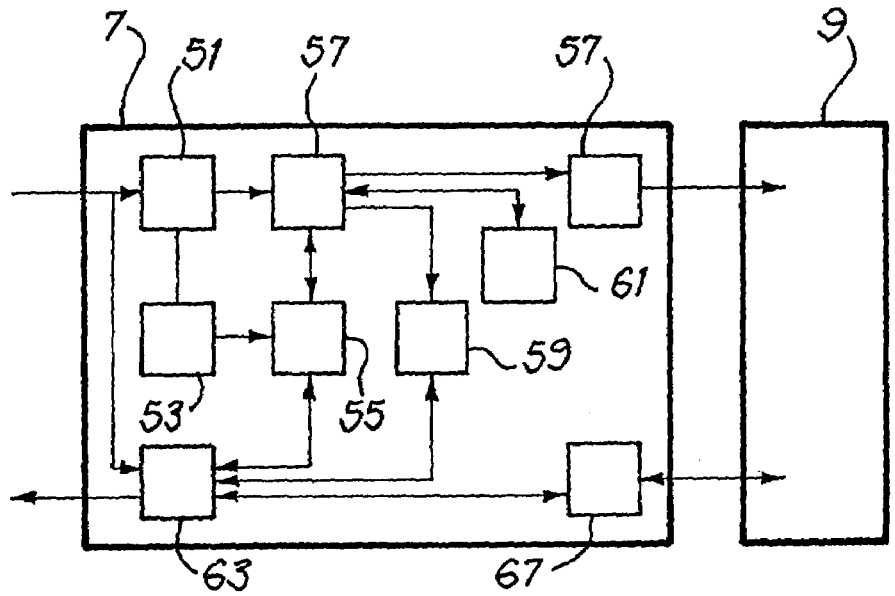
FIG. 9(a)
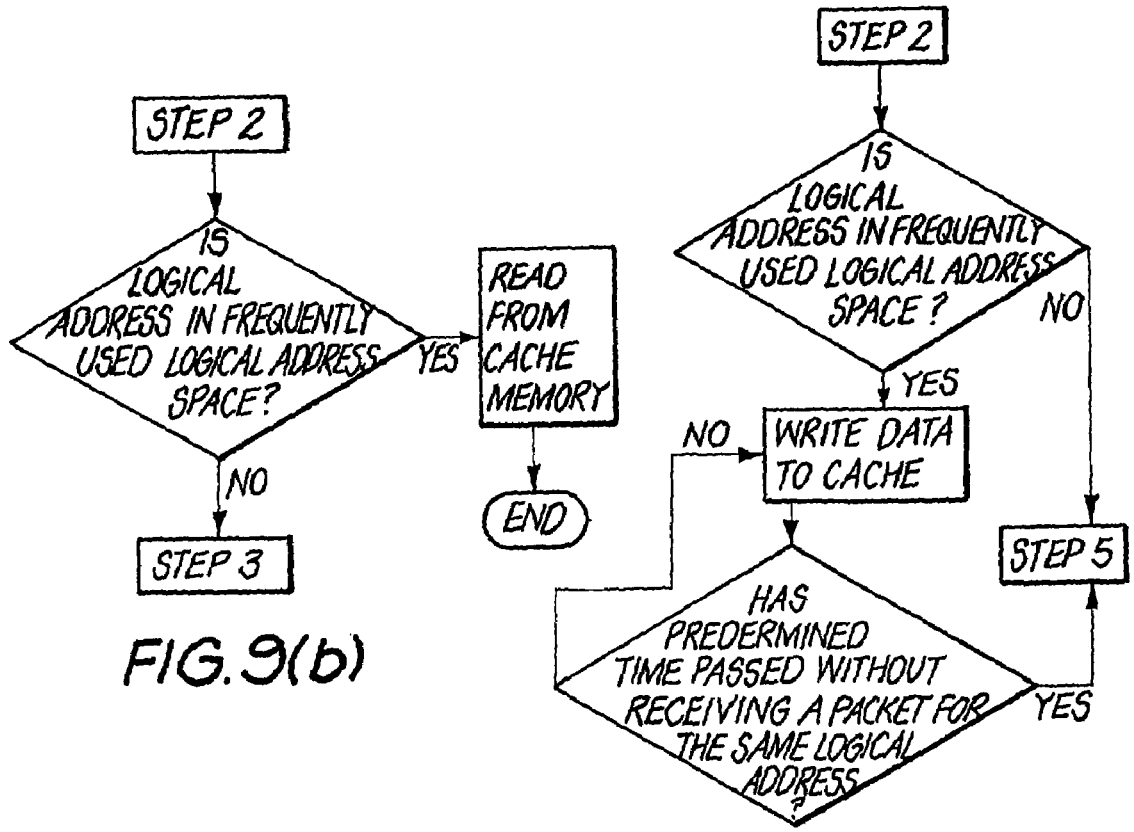
FIG. 9(b)
FIG. 9(c)

PORTABLE DATA STORAGE DEVICE USING A MEMORY ADDRESS MAPPING TABLE

FIELD OF THE INVENTION

The present invention relates to portable data storage devices, and methods of employing the devices for storing and retrieving data written to them.

BACKGROUND OF INVENTION

During the past couple of years, there has been much interest in providing a data storage devices containing a flash memory and which can be connected to the serial bus of a computer. A leading document in this field is WO 01/61692, which describes a one-piece device subsequently marketed under the trade mark "Thumbdrive". In one of the embodiments described in this document a male USB plug mounted on the housing of the device connects directly to a female USB socket in a computer, so that the computer is able to transfer data to and from the flash memory of the portable storage device under the control of a USB controller. Various improvements have been proposed to this device. For example, WO03/003282 discloses that the device may be provided with a fingerprint sensor, and that access to data stored within the device is only allowed in the case that the fingerprint sensor verifies the identity of a user by comparing the user's scanned fingerprint to pre-stored data. The disclosure of both of these documents is incorporated herein by reference.

The structure of such a portable storage device may be as shown in FIG. 1. The portable storage device is labelled 1 having a housing shown dashed. It includes a USB controller 2 which controls a USB interface 3 (e.g. a USB plug) which directly connects to the USB interface 4 (e.g. a USB socket) of a host computer 5. Data transferred to the USB interface 3 from the host computer 5 passes through the USB controller 2 to a master control unit 7.

Data packets are of various sorts. They include WRITE data packets, which contain WRITE instructions to write an amount of data which is a multiple of 512 bytes to a specific logical address. They include also READ data packets which contain a READ instruction to read data from a specific logical address. The WRITE instruction typically contains a logical address of the location at which the first part of the data has to be written, an indication of how much data is to be written, and then the data which is to be written. It may take several data packets to communicate one WRITE instruction. Similarly, a READ instruction indicates a logical address from which to start reading, and an indication of how much memory is to be read starting there.

The master control unit 7 implements these instructions by controlling a NAND flash memory 9. The master control unit 7 controls the NAND flash memory 9 by command symbols which are passed by one or more lines shown schematically as 12. Typically these lines 12 include a line which sends a WRITE signal when data is to be written to the flash memory 9, a line which sends a READ signal when the flash memory is to send data to the master control unit 7, lines which send an address signal indicating a location in the memory to which data should be written or from which data should be read, and an ENABLE signal which has to take a certain value for the flash memory to operate at all.

When the master control unit 7 needs to store data in the flash memory 9, it sends it there via an 8-bit bus 8, at the same time as a WRITE command, ENABLE signal, and address are sent. The address is a physical address (i.e. a specific address in the memory unit 9) corresponding to the logical address according to a mapping stored in RAM memory in or accessed by the master control unit 7. When in response to a READ command, data is transferred out of the device, it passes in 512 byte packets from the NAND flash memory 9, through the 8-bit bus 8, to the master control unit 7. The master control unit sends the 512 byte packets to the USB controller 2, which sends them out of the device 1 through the USB interface 3 to the host 5.

The device is conventionally powered through the USB interface 3, so that when the USB interface 3 is unplugged from the USB socket of the computer, the device powers down. All data stored in the RAM of the master control unit 7 is lost.

FIG. 2 shows the memory space of the NAND flash memory 9. The device is configured to store 512 byte sections of data in respective "pages" 6 (note that other possibilities exist, such as each page storing 2 kilobytes), each of which also contains a respective control data storage sector 11 which stores control data (typically up to 16 bytes). The data is arranged in "blocks" 10 (i.e. the respective rows of FIG. 2), with for example 64 pages 6 to each block 10. Conventional NAND flash memories have three limitations:

1. Any given page is either in an "erased" state, in which data can be written into it, or a "non-erased" state in which data is stored in the page and different data cannot be written into the page. Pages can only be changed from the non-erased state to the erased state on a block-by-block basis, i.e. all the non-erased pages of a given block must be erased at once, losing all the data stored there.

2. A given block or page has a limited life-cycle. In other words, it can only be changed from the erased to the non-erased state a limited number of times, such as 10,000 or 10,000 times. This limits the lifetime of the memory device.

3. The NAND flash memory contains occasional blocks which are "bad" in the sense that data cannot be reliably written there.

As mentioned above, the address in the NAND memory device 9 into which data is written, or from which data is read, is determined by a logical address encoded in a data packet received through the USB interface 3. Conventionally, the master control unit has access to a table storing a mapping between addresses in the logical address space and locations in the physical memory space which are within blocks of the memory device which are not in the dirty table (i.e. the "physical address" within the memory). Specifically, each block is mapped to a respective region of the logical address space having a number of addresses equal to the number of pages. This mapping is fixed. Thus, the bad blocks are not associated with any of the logical addresses.

Apart from the bad blocks, there are other blocks which are not associated with the logical addresses. These are "reserved" blocks which are used for storing other data the portable storage device may need. For example, the dirty address table itself is stored in the reserved blocks.

The master control unit 7 includes a file management system, including a block allocation table, which indicates whether and how much of each of the blocks are in the erased state or the non-erased state. When the master control unit 7 receives data to be written to a location in the memory which is within one of the blocks, the master control unit 7 uses the block allocation table to find whether the block is in the erased state. If it finds that the block is in the non-erased state, it conventionally copies any data in the block which is not to be overwritten to a different location, erases the block, and then writes back to the block both the new data which is to be stored in the memory and the data copied to the different location.

SUMMARY OF THE INVENTION

The present invention aims to provide a new and useful portable data storage device.

In general terms, the present invention proposes that the mapping between regions of the logical address space and regions in the physical memory space is changed during the operation of the device. In other words, there remains a one-to-one mapping between logical address regions and physical memory regions, but this mapping changes over time.

This has a number of advantages.

Firstly, the present inventors have noticed that generally the logical addresses generated by a conventional operating system on the host computer tend to be statistically correlated, which means that if the logical addresses have a fixed relationship to the physical addresses, then some physical addresses are used much more frequently than others and therefore tend to wear out quickly.

Furthermore, being able to vary the relationship between logical and physical addresses means that the number of write operations which are required to write data is reduced. Essentially, when an instruction is received to write data into a page for which, according to the present mapping of logical and physical addresses, is in the non-erased state, the mapping of logical and physical addresses can be changed so that a new block in the erased state is associated with that logical address. The new data is written to the new block, and any data stored in the old block that is not to be erased is also written to the new block. Thus the old data only has to be copied once, not twice as in the conventional method discussed above. This makes the total operation of the device faster.

The temporary mapping between the logical and the physical addresses is defined by a memory address mapping table. For speed of operation the memory address mapping table is preferably stored in RAM memory (e.g. in the master control unit itself). But the mapping data which defines it is also preferably stored in the flash memory device itself, so that it is not lost in a power-down situation.

In particular, the control data storage sector of one or more pages of a given block may store data indicating which logical address region the block is presently associated with. When the device is connected to a host computer, and the master control unit is powered, the master control unit uses this data to generate the mapping table (which may be stored in its cache memory). As the mapping is changed, such that the physical address corresponding to a given logical address region changes from a first block to a second block, the data in the mapping table and the corresponding data stored in the flash memory device are kept updated. In the case of the data stored in the flash memory, this may simply be by copying the data defining the mapping from the first block to the second block before the first block is erased.

As mentioned above, in conventional systems the logical address space is smaller than the physical address space, since there are blocks which are not associated with any of the logical addresses. These are the reserved blocks and the bad blocks. In embodiments of the present invention, in addition to the reserved blocks and bad blocks, there are at any time a set of further blocks (here referred to as "queuing blocks") which are available to become mapped to one of the logical address regions in place of blocks which are presently mapped to that logical address region. When the mapping is to be varied, one of the queuing blocks is selected to become associated with one of the logical address regions. The queuing blocks are preferably in the erased state while they queue, rather than being erased just before they become associated with one of the logical address regions.

The updating of the memory address mapping (i.e. the selection of an erased second block to replace a first block in the mapping) may be performed whenever a new WRITE instruction is received to write data to a location in the physical address which is not in the erased state.

It may be performed as soon as this WRITE instruction is received. Alternatively, in a preferred refinement of the present invention, a write operation performed by the master control unit based on a given WRITE instruction may be suspended for a certain period, and performed only provided that no instruction meeting a predefined similarity criterion with the first instruction is received during that period. Just as the concept of the variable address mapping table discussed above is motivated partly by the observation that logical addresses are statistically correlated, this refinement is motivated by the observation that frequently instructions which are received during a relatively short period of time are sufficiently strongly correlated that they can be more efficiently processed together than separately, thus improving the speed and/or lifetime of the portable data storage device. This concept of suspending a write operation to determine whether another correlated WRITE instruction arrives, constitutes another independent aspect of the invention, which may be used within the scope of the invention other than in combination with the variable mapping table.

A first such correlation is that frequently successive write instructions specify that data is to be written into consecutive the same logical region. To address this, when the master control device receives a first instruction specifying that data is to be written into a logical address region corresponding under the memory address mapping to a given first block of the physical memory, the master control device preferably suspends at least one of the operations which cause data stored in the first block which is not to be overwritten to be copied into the second block. If during that period, the master control device receives no packet containing an instruction to write data into the successive page of the block, then it may continue with the operation of copying the data in the first block into the second block. Alternatively, if during the period it receives one of more packets specifying other data to be written into other locations in the same logical address region, then it can write the data from all of the packets into the block, and in this case only needs to copy the data from other portions of the first block into the second block.

A second such correlation is that, as the present inventors have noticed, frequently the master control device will receive within a short space of time packets containing WRITE instructions specifying exactly the same logical address. Rather than at once resetting the memory address mapping whenever each of these instructions is received, embodiments of the present invention preferably suspend this operation during a time period. During this period the data is stored in a data cache operated by the master control device (e.g. its internal RAM cache memory). If no instruction relating to the same logical address is received during the time period, then the master control device proceeds with writing the data to the flash memory as discussed above. However, if, during the period, a WRITE instruction is received (or, in alternative embodiments, not one relating to the same logical address), the master control device instead writes the data to its cache memory (and normally resets its clock). If during the period a READ instruction is received in respect of the same logical address, that data is read from the cache memory, not from the flash memory device.

Optionally, the cache memory may be large enough to store data in respect of multiple logical addresses. That is the cache memory may be divided into a plurality of sections, each being for storing data in respect of a corresponding logical address, and each being associated with a respective timer for measuring the time since a WRITE instruction in respect of that logical address has been received.

Preferably, the data storage device is capable of distinguishing which logical addresses are particularly likely to have data written to them very often (i.e. it performs a pattern recognition algorithm based on the input instructions), so that it can select a set of one or more logical address for which it is worth performing the caching operation described in the preceding two paragraphs.

The description above assumes that there is a respective mapping for each of the blocks which are to be associated with logical address regions, but this would require the memory address mapping table to have at least as many element as the number of blocks which are available for storing data. An alternative is to associate logical address regions with respective groups of blocks. For example, the blocks may be grouped in groups of (say) four blocks (thus a total of, for example, 4×64=256 pages), and logical address regions would be larger by the corresponding factor (e.g. four). The memory address mapping table would in this case define a one-to-one mapping between each of these groups and a respective one of the logical address regions.

The groups may simply be consecutive ones of the blocks, but in the case that there are any bad blocks, a more sophisticated way of setting blocks is preferable in which the blocks which are not bad are grouped. The groups of blocks can then be treated as the regions of physical memory which are associated with regions of the logical address space. The master control unit has access to a grouping table indicating this grouping, so that given a logical address it can use the memory address table to determine a corresponding group and the grouping table to identify the blocks constituting this group.

Since bad blocks are relatively rare, the majority of the groups could be set according to a simple rule (e.g. that the groups are respective sets of four consecutive blocks), and the grouping table would only store data in respect of blocks which failed to follow this rule. This would reduce the required size of the grouping table.

Conveniently, the fact that a given logical address region is associated with one of these exceptional groups could be included as a flag in the mapping address table. Thus, the memory mapping address table would indicate when it is necessary to consult the grouping table to determine the physical address associated with a given logical address.

The master control unit may associate logical addresses in a given logical address region with the blocks of the corresponding group, such that consecutive logical addresses correspond to "columns" of pages. This concept of providing groups of blocks to correspond to logical address regions, and to associate consecutive logical addresses within a logical address region with columns of pages, constitutes another independent aspect of the invention, which may be used within the scope of the invention other than in combination with the variable mapping table.

One specific expression of the first aspect of the invention is a portable data storage device including:

(i) a data interface for transferring data packets into and out of the device, (ii) an interface controller, (iii) a master control unit, and (iv) at least one NAND flash memory unit, the interface controller being arranged to send data received through the interface to the master control unit, and the master control unit being arranged to recognise certain data packets as encoding READ instructions and other data packets as encoding WRITE instructions:

(a) upon receiving a READ instruction indicating a logical address, to access a memory address mapping table which associates logical address regions within a logical memory space with respective first physical address regions within the memory unit, to read data from a physical address in the memory unit corresponding to the logical address according to the address mapping table, and to transmit to the data interface one or more data packets including the data which was read, and (b) upon receiving WRITE instruction indicating a logical address and data to be written to that logical address, to determine if the physical address corresponding to the logical address according to the memory address mapping table is in the erased state and:

if so, to write the data to that physical address, or if not, to modify the address mapping table to associate a second physical address region with the logical address region containing the logical address, to write the data to a physical address corresponding to the logical address according to the modified memory address mapping table, and to copy any data stored in other potions of the first physical address region to corresponding locations of the second physical address region.

It is to be understood that within the context of the intention there may be WRITE instructions which contain data to be stored in multiple ones of the pages, or READ data packets which request data from multiple pages. In other words, the address mentioned above may for example be the starting address of a multi-page portion of a physical address region.

BRIEF DESCRIPTION OF THE FIGURES

Preferred features of the invention will now be described, for the sake of illustration only, with reference to the following figures in which:

FIG. 5 shows the memory address mapping table of FIG. 3 after a certain data write operation;

FIG. 7, which is composed of FIGS. 7(a) to 7(e), shows the state of a physical memory of a third embodiment of the invention at respective times;

FIG. 9, which is composed of FIGS. 9(a) to 9(c), illustrates a fourth embodiment of the invention.

DETAILED DESCRIPTION OF THE EMBODIMENTS

Figure 1:
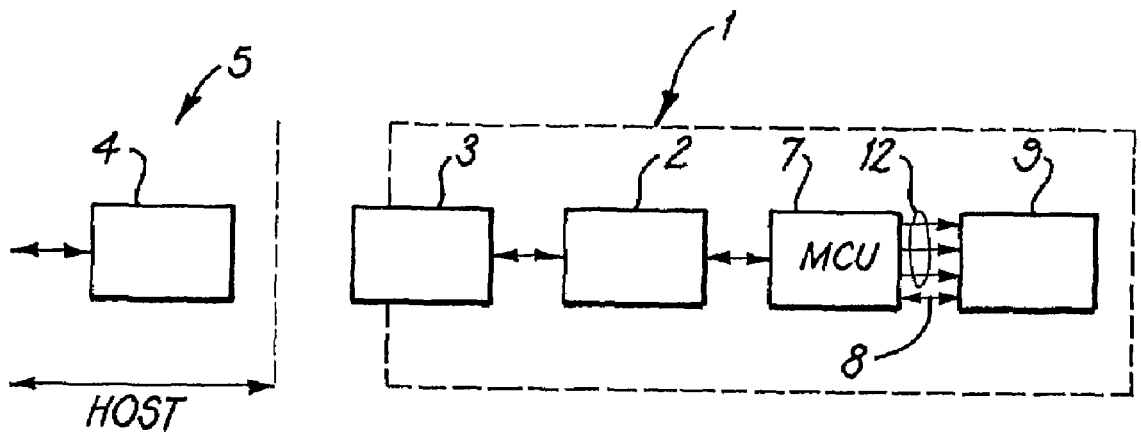
FIG. 1 shows a first configuration of a known portable data storage device.
Figure 2:
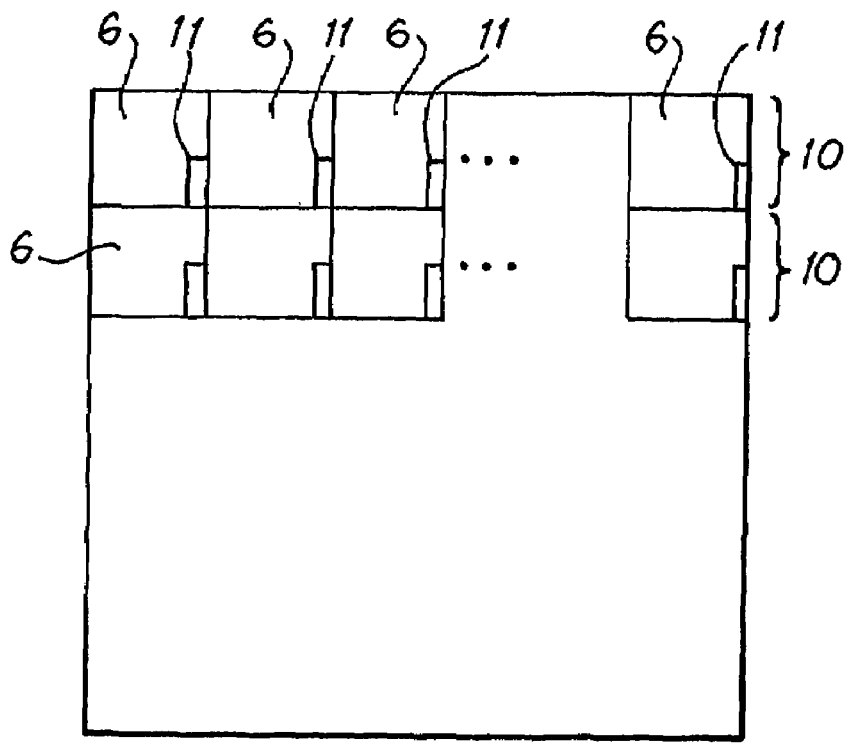
FIG. 2 shows the physical memory space of a NAND flash memory device of the known device of FIG. 1.

A first embodiment of the invention will now be described. It may have the same physical structure as shown in FIG. 1, and for that reason the corresponding elements of the embodiment will be given the same reference numerals as used in FIG. 1. All the elements shown may be contained in a single housing, e.g. one on which the USB connector 3 is mounted. The USB connector 3 (e.g. USB plug) may be connected directly to a host computer (e.g. a personal computer (PC)) by plugging in to a USB socket 4 of the host computer 5. Alternatively, a cable may be attached between them. It should be noted that this device may have many features which are not shown explicitly in FIG. 1, but which are known in other publicly-available portable data storage devices, such as password protection, access controlled by fingerprint verification, etc. The implementation of such features will be clear to one skilled in the art.

Figure 3:
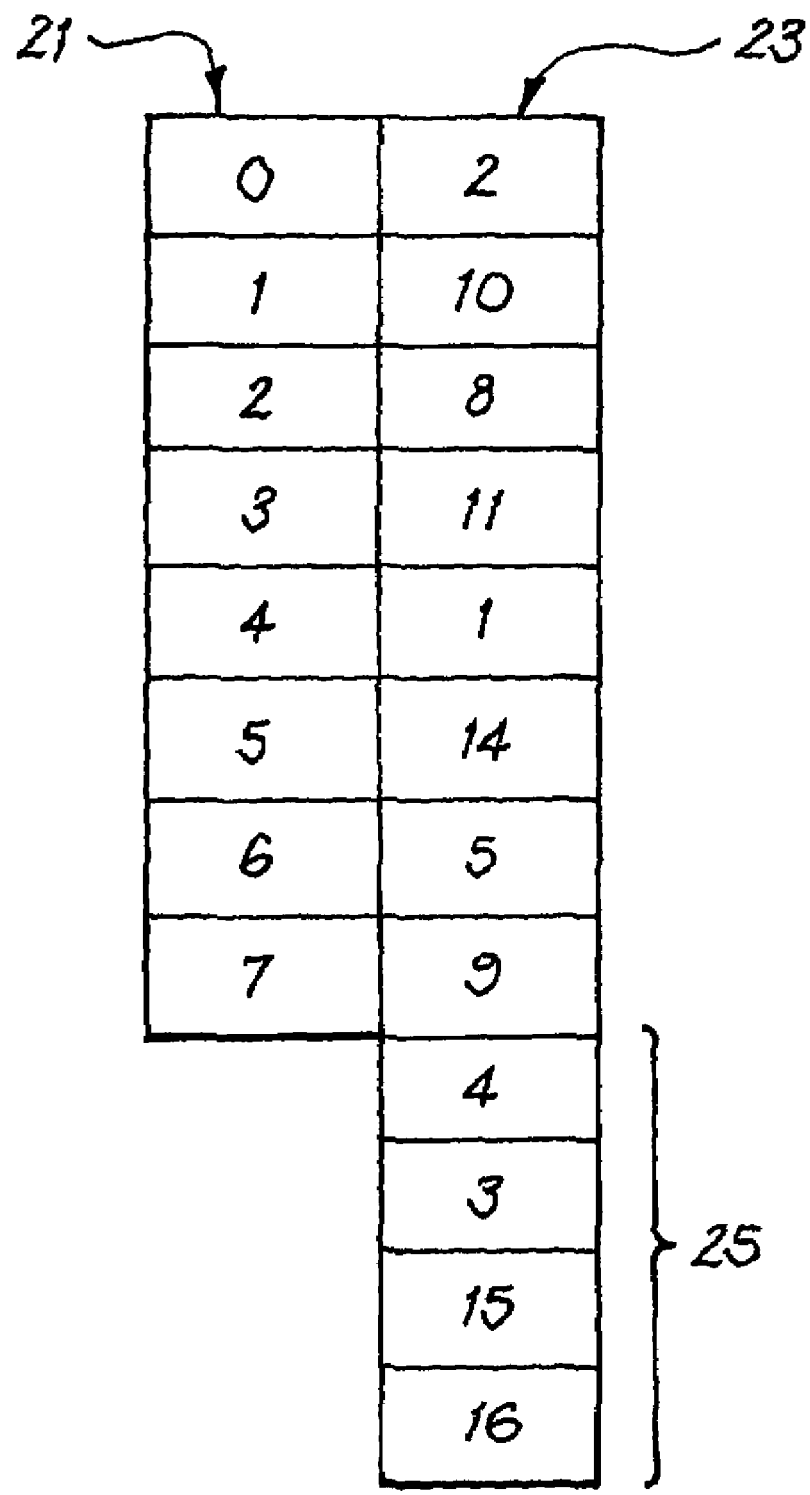
FIG. 3 shows a memory address mapping table in a first embodiment of the invention.

FIG. 3 shows the memory address mapping table used by the first embodiment. This table is stored in the volatile RAM memory of the master control unit 7. On the left column 21 are indices labelling logical address regions, and on the right 23 are digits labelling the blocks of the physical address space which are one-to-one mapped to those logical address regions. For simplicity, it will be assumed that the number of logical address regions is 8 (labelled by the indices 0 to 7), and that the number of blocks is 16 (labelled the indices 0 to 15). In reality, both of these numbers will be very much higher). Thus, the amount of data which can be stored in each of the logical address regions is 512 bytes (assuming that this is the size of the pages) times the number of pages per block (e.g. 64). Each row of the right column stores only an index labelled a corresponding block. The number of logical address regions corresponds to the number blocks which will be used for storing data at any one time.

For example, since it is assumed that there are 64 pages per block, the logical address 67 relates to a page in logical address region 1. This is because the pages of logical address region 1 have logical addresses 0, 1, . . . 63 and the pages of logical address region 1 have logical addresses 64, 65, . . . 127, so logical address 67 is the fourth address in logical address region 1. Under the mapping shown in FIG. 3, the logical address region 1 is mapped to block 10.

In addition to the blocks which are mapped to the logical address regions, the physical address space includes a number of other blocks (8 in the example shown above). These include blocks 6, 12 and 13 which are reserved, and bad block 7 which is "bad" (not functional). Thus, these addresses do not appear in the mapping table of FIG. 3 (though preferably the embodiment does also have a dirty block table and a table of reserved blocks, which may be used in conventional ways to perform other operations conventional in portable storage device). This leaves a number of blocks (four in this example) which are available to become mapped to the logical address regions.

These blocks, referred to as "queuing blocks", are shown as 25 in the memory address mapping table of FIG. 3. These blocks are in the erased state. When a block is removed from the top of the queue all the other blocks are moved up by one; a new block is then inserted into the bottom row of the section 25. Conveniently, this may be implemented by arranging for four locations in a memory to each store one of the indices and to have a pointer indicating one of the four locations. The location to which the pointer points is logically equivalent to the "top row" of the section 25. Removing the index and the "top row" of the section 25 and writing a new index into the "bottom row" of the section, thus corresponds to overwriting the new index into the location to which the pointer points and changing the pointer in a round-robin manner to point at a next one of the locations.

The control data storage sector 11 of the first page of each block which is mapped to a corresponding logical address region includes the index of the corresponding logical address region (if the number of bits required to store this index is greater than the number of bits available in the sector 11 of the first page, the index may be coded and stored in the sectors 11 of more than one page of the corresponding block). Thus, if the device is powered-down (so that the memory address mapping table of FIG. 3 is lost from the RAM), when the device is powered again the master control unit 7 can regenerate the memory address mapping table in its RAM using the indices stored in the control data storage sectors 11.

Figure 4:
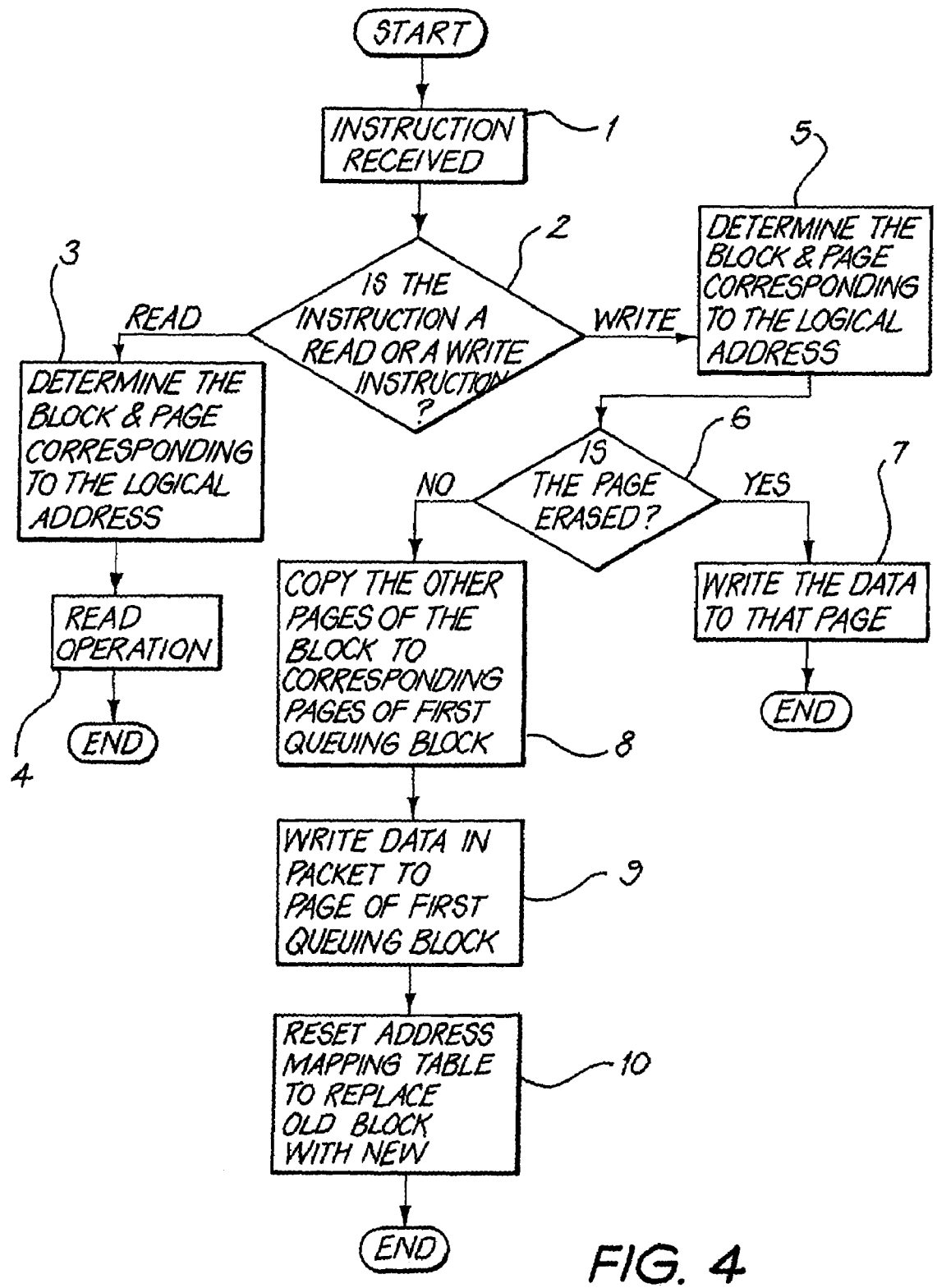
FIG. 4 is a flow diagram of the steps performed in the first embodiment of the invention.

We now consider the operation of the first embodiment, with reference to the flow diagram shown in FIG. 4. In step 1 an instruction is received, and in step 2 the master control unit 7 determines whether it is a READ instruction or a WRITE instruction.

Suppose the instruction is a READ instruction to read data starting from logical address 67. In step 3 the master control unit 7 uses the memory address mapping table of FIG. 3 to determine the corresponding block corresponding to the logical address region containing the logical address (i.e. block 10), and within that block the page(s) corresponding to the logical address (i.e. the fourth page). Then in step 4 the read operation is performed according to the known technique: the master control unit 7 issues a command to the memory unit 9 to extract the data stored fourth page from block 10; this data is transmitted from the memory unit 9 to the master control unit 7 via the bus 8; the master control unit forms this into one or more packets and transmits it out of the device.

Suppose the master control unit receives a WRITE instruction to write certain data beginning at the logical address 67. In step 5 the master control unit 7 determines the block and page corresponding to the logical address (as in step 3), and in step 6 the master control unit determines whether this page is in the erased or non-erased state. This may be done using a file management system (e.g. employing a block allocation table as in the prior art described above).

If the fourth page of block 10 is erased, then the master control unit 7 just sends a write instruction to the memory 9 to cause the memory to store the data in the fourth page of block 10, according to conventional techniques.

Figure 5:
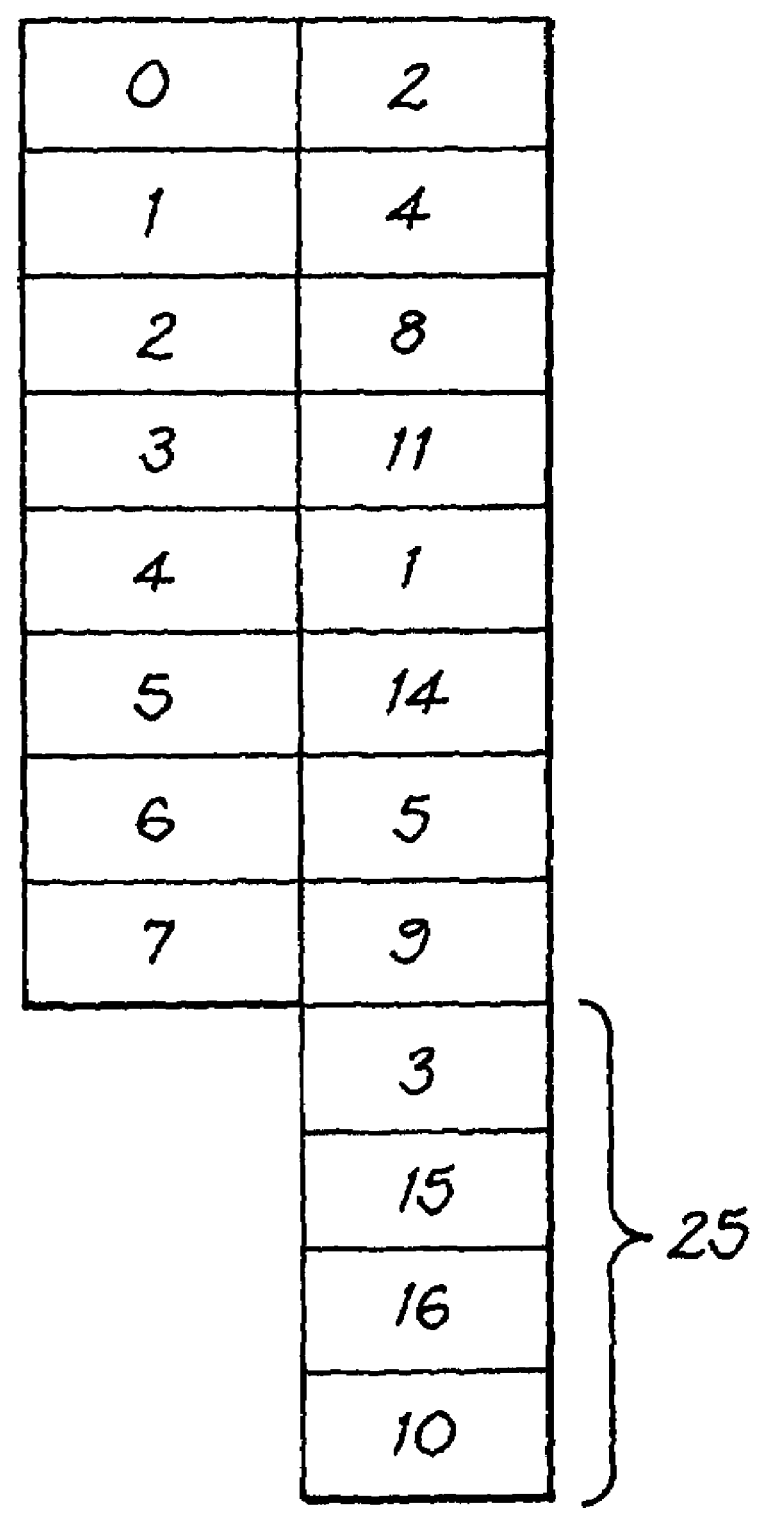

Alternatively, if the fourth page of the block 10 is not-erased, then in step 8 the master control unit instructs the memory unit to copy any data stored in the first three pages of block 10 and in the last 60 pages of block 10 to a new block. This new block is the first of the queuing blocks 25, that is block 4. Then in step 9 the data included in the WRITE instruction is written to page 4 of block 4. Then in step 10 the memory address table is reset to the form shown in FIG. 5. That is, the block 4 is now associated with the logical address region 1. The block 10 is erased, and placed at the back of the queue 25. Since there are four blocks in the queue, the block 10 will be reused on the next-but-three time that the master control unit is instructed to write data to a page which is non-erased. Note that the operations of steps 8 to 10 may be performed in any other order, according to the implementation.

Note that an alternative to using a file management system is for the device to omit steps 6 and 7, and to proceed straight from step 5 to step 8. In other words, every time a write instruction is received, the copying steps 8 to 10 would be performed.

FIG. 6 shows a second embodiment of the invention. Whereas in the first embodiment, each of the 8 logical address regions is mapped to a respective block, in the second embodiment each of the logical address regions (still 8 in this example) is mapped to a corresponding group of blocks (in this example, four blocks). In this example, the number of blocks is equal to 64, labelled by an index 0 to 63. Blocks 60, 61, 62 and 63 are taken as reserved. Blocks 9, 17, 18, and 27 are assumed to be bad. The bad groups are given in a "dirty table" which is shown in FIG. 6(*a*). This table may be generated the first time the device is powered by testing all the blocks and finding the bad ones; following this the reserved blocks can be defined ensuring that they do not include bad blocks. The bad block table is then typically stored in one or more of the reserved blocks; alternatively it may be regenerated whenever the device is powered.

The memory address mapping table is shown in FIG. 6(*b*). In this case each of the logical address regions 0 to 7 (in the left column 31) is shown mapped to a group number (in the middle column 33). There are 12 groups available to be mapped to respective ones of the logical address regions, and these groups are labelled by the respective group indices 0 to 11.

Most groups, having an index of say i, are composed of the set of blocks **4*i*-4, 4*i*-3, 4*i*-2 and 4*i*-1. However, there are blocks which are an exception to this simple rule, because if the rule were followed that group would include one or more blocks which were bad. The blocks which define such groups are given in a "clean table", shown in FIG. 6**(*c*).

For example, group 1 is simply the first four blocks 0, 1, 2 and 3. Group 2 is the second set of four blocks 4, 5, 6, 7. Group 3, however, is not blocks 8, 9, 10 and 11, however, because as mentioned above block 9 is bad. Instead, the clean table of FIG. 6(*c*) indicates that group 3 is made up of blocks 8, 59, 10 and 11. Group 4 is, according to the usual rule, the blocks 12, 13, 14, 15. Group 5 is, again, an exception to the general rule (because blocks 17 and 18 are bad), and according to the clean table is made up of blocks 16, 58, 57, 19. Group 6 is again regular, i.e. blocks 20, 21, 22 and 23. Group 7 is again irregular (since block 27 is bad), and according to the clean table it is blocks 24, 25, 26 and 56. Groups 8 to 11 are according to the usual rule.

Thus, the clean table defines the members of only three groups in this example: groups 3, 5 and 7. In fact, in more typical embodiments the proportion of bad groups is very low, so that the clean table is much smaller than the memory address mapping table. The maximum number of rows of the clean table is the number of bad groups.

To indicate that group 3 is not according to the rule, the memory address mapping table contains a flag in the third column 37, and a corresponding indication in the fourth column 38 of which row of the clean table of FIG. 6(*c*) to refer to obtain the exact membership of the group (in FIG. 6(*b*) the values in the fourth column 38 are respectively 0, 1, 2, and these three values labelling respectively the three rows of the clean table of FIG. 6(*c*)).

When the master control unit receives a WRITE instruction instructing it to write certain data to logical address 67, in this case it identifies that the logical address is within the logical address region 0 (since logical address region 0 is logical addresses 0 to 255). The mapping between logical addresses and groups in FIG. 6(*b*) shows that the corresponding group is group 2. The corresponding flag of column 37 is not set, so it is not necessary to consult the clean table to identify the blocks corresponding to group 2: the rule gives them as 4, 5, 6 and 7. The logical address 67 is thus the fourth page in block 5.

If this page is in the erased condition then the data from the WRITE instruction is written into that page.

If this page is not in the erased condition, then the data in the WRITE instruction is written into the fourth page of the second block of the group at the head of the queue 25, which happens to be group 7. The memory address mapping table of FIG. 6(*b*) is then updated to be FIG. 6(*d*) by moving the group number at the head of the queue (i.e. group number 7) into the column 33 at the row corresponding to logical address region 0, and also copying the flag indicating that block 7 is irregular into the same row of the third column 37, and the corresponding data indicating a row of the clean table into the new row of the fourth column 38. Any data stored in other pages of the blocks 4, 5, 6 and 7 is copied respectively to the corresponding pages of the group 7 (i.e. the respective pages of the blocks 24, 25, 26 and 56 respectively).

If subsequently a read instruction is received for the logical memory address 67, the master control unit 7 again determines that this corresponds to logical region 0, and therefore examines the corresponding row in the memory address mapping table of FIG. 6(*d*). This time it finds from column 33 that corresponding group is 7, and the flag in column 37 indicates that this group is irregular. Column 38 indicates that the group is in row 2 (i.e. the last row) of the clean table of FIG. 6(*c*). The master control unit therefore extracts the blocks of this row (i.e. blocks 24, 25, 26, 56) from the clean table of FIG. 6(*c*). It read the data from the fourth page of the second block of group 7 (i.e. block 25), generates one or more data packets encoding that data, and transmits the packet(s) out of the device via the interface 3.

If again a write instruction is received for the logical memory address 67, the master control unit 7 again examines the corresponding position in the memory address mapping table of FIG. 6(*d*). This time it finds that corresponding group is 7, and the flag in column 37 indicates that this group is irregular. The master control unit therefore extracts from column 38 the corresponding row number (i.e. 2), and obtains to the blocks of this row (i.e. blocks 24, 25, 26, 56) from the clean table of FIG. 6(*c*). It inspects the fourth page of the second block of group 7 (i.e. block 25) to see if data is stored there (which of course, given the history explained above, there is). It therefore, moves all the stored data in the other pages of the group to the corresponding pages of the group which is now at the head of the queue 35 (i.e. group 4) and writes the data of the WRITE instruction to the fourth page of the second block of this group. Then inserts the number 4 into column 33 at the top row, copies the (blank) flag corresponding to group 4 into column 37 at the top row, copies the (blank) data corresponding to group 4 into column 38 at the top row, inserts the index 7 into the bottom of the section 35 of the table (having moved the other rows up one), copies the corresponding flag into the bottom row of column 37, and copies the corresponding data into the bottom row of column 38.

Note that the flow corresponding to this process is almost identical to that of FIG. 4. However, it should be understood that steps 3 and 5 now are now more sophisticated. Instead of the block being determined just from the logical address and the memory address mapping table (e.g. of FIG. 3), it is determined by obtaining using the memory address mapping table (e.g. of FIGS. 6(*b*) and 6(*d*)) to obtain a corresponding group, and determining the blocks of the group (from the rule, or if a flag is present in column 37 of the memory address mapping table, from the row indicated in column 38 of the clean table of FIG. 6(*c*)). Also, in steps 8, 9 the reference to the first queuing block should in this case be understood as a reference to the corresponding block of the first queuing group (i.e. the group at the top of section 35 of the memory address mapping table).

This describes how the second embodiment operates the mapping between logical address regions and respective groups of blocks. A logically separate issue is how the embodiment maps logical addresses within any given logical address region to respective pages in the corresponding group of blocks.

One possibility is for the correspondence to be what we will call "horizontal". This means that the consecutive pages of the blocks to correspond to consecutive logical addresses. The final page of each block (except the last block of the group) corresponds to the logical address consecutively before the logical address corresponding to the first page of the next block of the group. Thus, for example, an amount of data which is slightly larger than the number of pages of a single block, will be written to the memory such that the beginning of the data is written to a page specified by a logical address, then consecutive pages of the block are written to until the block is exhausted, then the remaining portion of the data is written to the first pages of the next block.

However, this is not the only possibility. In a preferred form of the second embodiment of the invention, the master control unit may operate such that the logical correspondence of addresses to pages of the group of blocks is "vertical". Specifically (assuming, for the sake of example, that there are four blocks in a given group) the first four logical addresses may be mapped to the first pages of each of the blocks (i.e. the first logical address to the first page of the first block of the group; the second logical address to the first page of the second block of the group; and so on), the next four logical addresses may be mapped to the second pages of each of the blocks (i.e. the fifth logical address to the second page of the first block of the group; the sixth logical address to the second page of the second block of the group; and so on).

To put this another way, the master control unit 7 treats sets of four consecutive logical addresses as corresponding respectively to respective pages of the respective blocks. The pages associated with a given set of logical addresses all have the same offset value, measured counting horizontally along the pages of the respective block (i.e. these pages form a "column" in the physical address space).

Figures 6D, 6E:
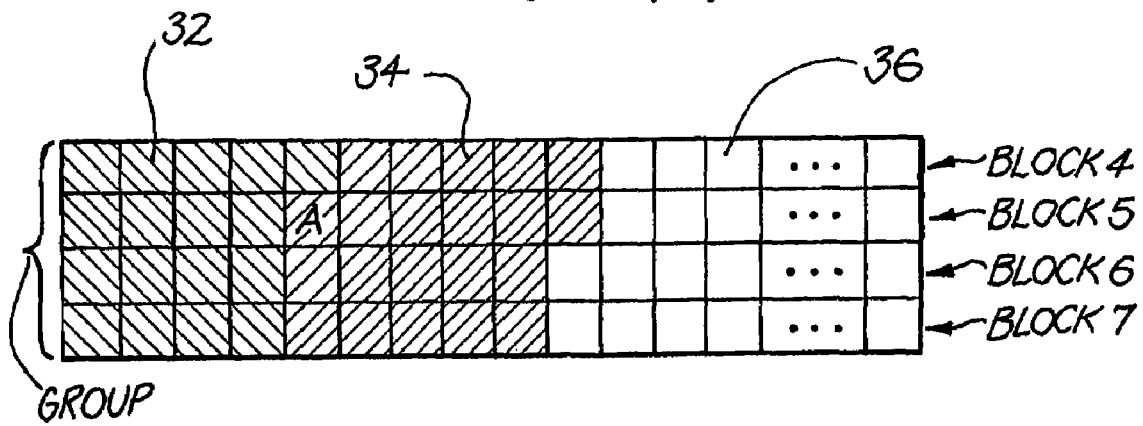
FIG. 6, which is composed of FIG. 6(a) to 6(e), shows a second embodiment of the invention.

FIG. 6(e) shows what happens when a certain amount of data is to be written to a location to group 2 (i.e. blocks 4, 5, 6 and 7). The logical address to which the beginning of the data is written has an offset of 17 relative to the logical address which corresponds to the first page of block 4. That is, the logical address to which the beginning of the data is written is the 17 pages after the first page of the group. These pages are counted vertically in FIG. 6(c) (i.e. first down the first column of pages, then down the next column). Thus, the page with an offset of 17 is the one indicated by "A".

In the writing operation, data from the old group is copied to locations in group indicated by the hashed area 32. Then the data in the write packet is written the pages in the hashed area 34 (i.e. starting at location A). Then any data in the old block which is in the unhashed region 36 following the region 34 is copied to region 34.

We now turn to a third embodiment of the invention. The third embodiment resembles the first embodiment, but with one (important) difference. In the third embodiment, following a WRITE instruction which causes the mapping defined in the memory address mapping table to be changed, and data contained in the WRITE instruction to be written into a location of the new block which becomes associated with the logical address, the operation of copying data from the rest of the old block into the new block is partially suspended for a pre-defined time to see whether any new WRITE instructions in respect of the same region of the memory space are received.

Specifically, suppose that a WRITE instruction is received indicating that data A is to be written a certain logical address. Suppose that that logical address is in a logical address region presently corresponding to block 0. Suppose further that the logical address corresponds to page 4 of block 0. Further suppose that the erased block at the top of the queue 25 (of FIG. 3) is block 3. FIG. 7(a) shows a portion of the physical memory including blocks 0 and 3. That is, block 0 has data labelled as X stored at page 0 to 3, data labelled as Y stored at page 4, data labelled Z at pages 5 to 7 and then the rest of the block is in the erased condition (shown as "0").

According to the first embodiment, this WRITE instruction would immediately cause the physical memory in blocks 1 and 3 to be as shown in FIG. 7(b). That is, the new data A is stored at page 4, and the data X and Z is stored at the pages of block 3 corresponding to their previous pages in block 0. Block 0 would be erased (and an index representing it would be at the bottom of section 25 of FIG. 3).

However, in the third embodiment of the invention the physical memory is instead initially rewritten to be as shown in FIG. 7(c). That is, the data A is written to page 4 of block 3, and the data X is copied to pages 0 to 3, but the data Z is not yet copied to pages 5 to 7 of block 3. The system remains in this configuration for a time period given by a timer. If by the end of this period no further WRITE signal has been received in respect of the logical address corresponding to page 5 of block 3, then the write operation is completed to give the data storage shown in FIG. 7(b). However, if during this period a new WRITE instruction is received which indicates that data B is to be stored at the logical address now corresponding to page 5 of block 3, then this data B is written to page 5 of block 3, giving the data storage shown in FIG. 7(d). The timer is then started again to define a new time period.

If by the end of this period no further WRITE signal has been received in respect of the logical address corresponding to page 6 of block 3, then the write operation is completed to give the data storage shown in FIG. 7(e). However, if during this period a new WRITE instruction is received which indicates that data C is to be stored at the logical address now corresponding to page 6 of block 3, then this data B is written to page 6 of block 3, and the timer is started again.

This process may be continued until the last page of the block 3 is reached, or a time period goes by without a WRITE instruction being received indicating data to be stored at the page following the location specified by the preceding WRITE instruction. Note that it means that data A, B, . . . can be written to the memory device much more quickly than in the first embodiment, since there is much reduced need to copy data. For example, during the sequence of steps described above, the data X only needs to be copied once at the very beginning no matter how many WRITE instructions are subsequently received in respect of consecutive pages.

Figure 8:
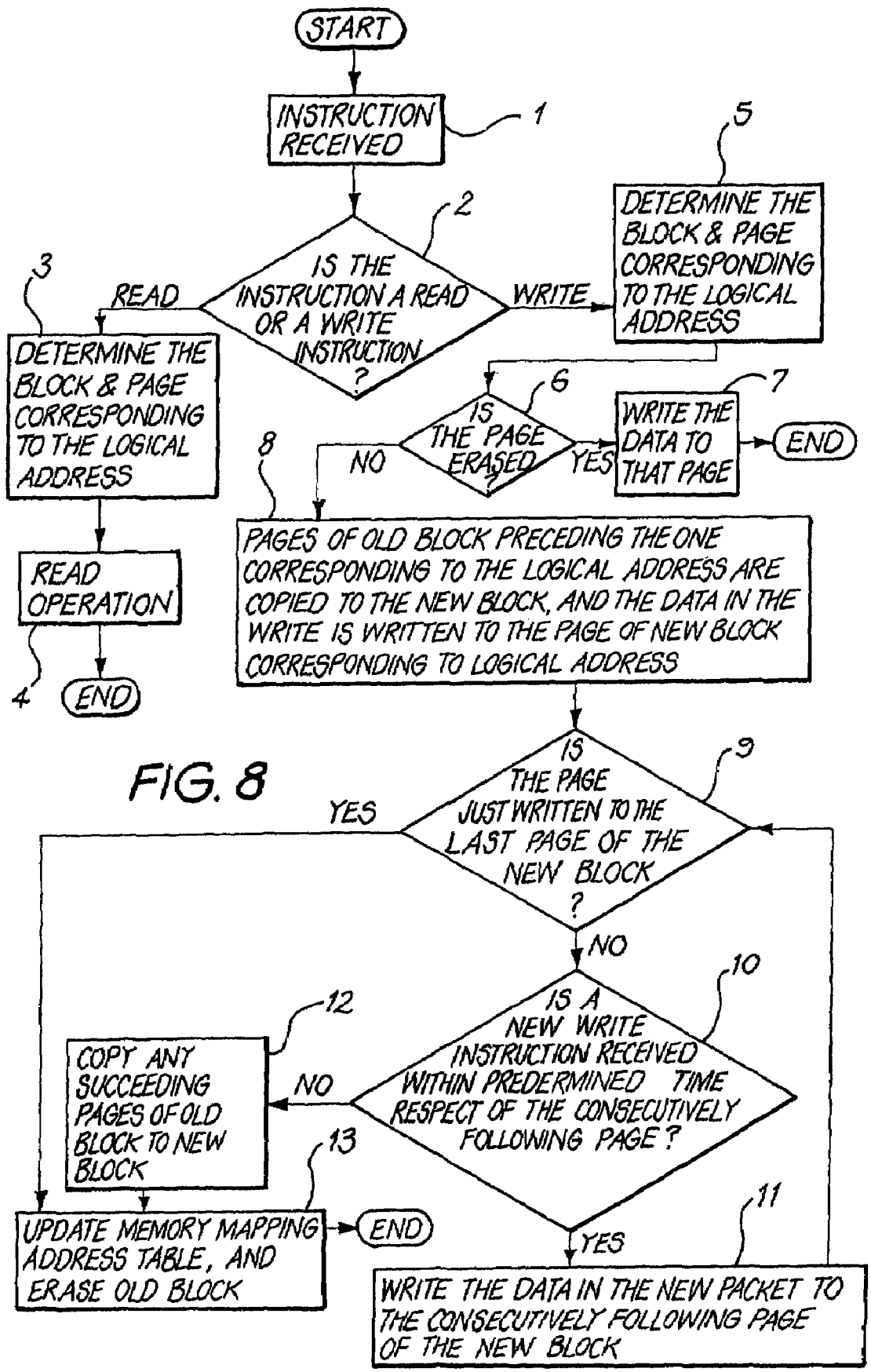
FIG. 8 is a flow diagram of the operation of the embodiment of FIG. 7.

The flow diagram is shown in FIG. 8, and differs from FIG. 6 only in that in steps 8 to 10 are replaced by steps 8 to 13. In step 8 of FIG. 8, only the pages in the old block (i.e. block 0) before the page in respect of which the WRITE instruction was received, are copied to the new block (i.e. block 3), and the data in the WRITE instruction is written to the page in the new block corresponding to the logical address. In step 9 it is determined whether the last page of the new block has now been written to. If so, the device proceeds to step 13. Otherwise, in step 10 the device determines whether, within the predetermined time, a new WRITE instruction is received in respect of the next consecutive page of the new block. If so, the embodiment writes the data there in step 11 and loops back to step 9. If not, in step 12 the embodiment copies the rest of the pages of the old block (i.e. all the pages, if any, after the last page in respect of which a WRITE instruction was received). Step 13 corresponds to step 10 of FIG. 4: the old block (block 0) is erased and the memory mapping address table is updated.

Note that if, at a time when the embodiment is in step 10, a READ instruction is received in respect of a logical address in a logical address region which is currently the subject of the flow of FIG. 8, then the device should read the data from the correct place in the physical memory (i.e. from the new block if the logical address corresponds to the addresses written to in step 8, or if the logical address corresponds to an address which was written to in a preceding step 9; otherwise from the old block).

In certain forms of this embodiment, the device may proceed from step 10 to step 12 also in the case that in step 10 if it determined that a new WRITE instruction is received which instructs data to be written to any logical address other than the next consecutive page of the new block. In this case the processing of the new WRITE instruction can be begun after the flow of FIG. 4 is completed.

Note that the timer is typically set to a period of a few milliseconds, such as about 3 ms. If the device is disconnected from the host within the predetermined period after the last WRITE instruction is received, then there is a danger of data being lost. However, by setting the predetermined period to be of the order of milliseconds, this should not occur, and thus all the data will be securely stored. Note that the third embodiment of the invention reduces to the first embodiment in the limit of the predetermined period going to zero.

We turn now to a fourth embodiment of the invention. Like the third embodiment, the fourth embodiment employs a timer.

The master control unit 7 in this case includes a pattern recognition unit which receives the logical addresses extracted by the master control unit from WRITE instructions. If, during a certain phase of operation, the pattern recognition unit notices that a certain logical address appears much more frequently than would be expected, then it writes that logical memory address into a "frequently used logical address" space, e.g. defined in the RAM memory of the master control unit. More generally, the frequently used logical address space may contain a plurality of such identified logical addresses having a high frequency. The pattern recognition unit may be programmed to strike logical addresses out of this space when their frequency reduces, and/or to replace it in the space whenever a logical address is identified having a yet higher frequency of usage. Thus, the space continually stores the logical addresses which occur most frequently in WRITE instructions.

The master control unit 7 maintains a cache RAM memory for each location in the frequently used address space. Upon receiving a WRITE instruction in respect of one of the addresses stored in the frequently used logical address space, the master control unit does not initially write the data contained in the WRITE instruction into the flash memory device. Instead, it writes that data into the corresponding cache. The master control unit 7 then waits for a time determined by the timer. If, during that time, no further WRITE instruction is received (or, in one form of the embodiment, if a packet is received in respect of a different block), then the master control unit writes the data in the cache into the flash memory according to the process described above in relation any of the first to third embodiments of the invention. If, on the other hand, during the predetermined period another WRITE instruction is received in respect of the same logical address, then the master control unit writes the data contained in that WRITE instruction to the same location its cache (i.e. overwriting the data which was written there due to the first write packet). The timer is then restarted.

Thus, it will be seen that if the device 1 receives a large number of WRITE instructions in respect of the same logical memory address, spaced apart by an average time which is lower than the predetermined time set by the timer, the number of those WRITE instructions which will cause a (computationally expensive) write operation to the memory device 9 will be low.

The structure of part of the master control unit 9 is shown schedule in FIG. 9. The master control unit 9 contains a section 51 for separating a WRITE instruction into a logical address and data to be written to that logical address. The logical address is sent to a pattern recognition unit 53, which uses it is to keep updated a frequently used address space 55. The master control unit has a switch 57 which determines whether the logical address of the WRITE instruction just received is in the frequently used address space 55. If not, the data and logical address are written at once to a unit 57 which writes them to the flash memory 9 according to the method of the first embodiment. If so, the data is written to a cache memory 59 and a timer in timing unit 61 is set running. If the timer in timing unit 61 reaches the end of the predetermined period without being reset again, the data and corresponding logical address are passed by switch 57 from cache 59 to the unit 57. Note that although FIG. 9(*a*) shows only a single timing unit 61, that timing unit 61 typically contains a respective timer for each respective logical addresses in the frequently units logical address space, and for each of these logical addresses there is a respective cache memory location.

If a READ instruction is received, a unit 63 determines whether the logical address is one of the ones stored in the frequently used address space, and if so determines whether the corresponding timer is running. If so, it reads the data from the corresponding cache memory 59; otherwise it uses a unit 67 to read the data from the flash memory 9 according to the correspondence defined by the memory address mapping table (i.e. according to the method of the first embodiment). In either case, it encodes the data into a packet which is transmitted out of the device through the interface 3.

The flow diagram of the embodiment is that of FIG. 3, except that the steps of FIG. 9(*b*) are inserted between steps 2 and 3 in FIG. 3 (and performed by the units 51 and 57), and the steps of FIG. 9(*c*) are inserted between steps 2 and 5 of FIG. 3 (and performed by the unit 63). In steps 7 and 9 the data which is written to the page is the data in the last WRITE instruction received in respect of that logical address.

Whenever the unit 53 removes a logical address from the frequently used logical address space (i.e. updates unit 55), the data in the corresponding location of the cache 59 is written to the memory 9 according to the steps 5 to 10 of FIG. 3.

In either the third and/or fourth embodiments of the invention, the timer may be arranged such that the predetermined period which is only a few milliseconds, such as about 3 ms. If the device is disconnected from the host within the predetermined period after the last WRITE instruction is received, then there is a danger of data being lost. However, by setting the predetermined period to be of the order of milliseconds, this should not occur, and thus all the data will be securely stored. Note that the third and fourth embodiments of the invention each reduce to the first embodiment in the limit of the predetermined period going to zero.

Note that none of the embodiments described above require a block allocation table (although other embodiments are possible which do use such a table).

Although only a few embodiments of the invention have been described in detail here, many variations are possible within the scope of the invention as will be clear to a skilled reader. For example, the features of the second, third and fourth embodiments can readily be combined in any combination, and indeed the combination of all the features described (including the vertical filling of the pages of the groups of blocks) is preferred. Thus, an embodiment of the invention can be formed in which logical address regions are mapped to respective groups composed of a plurality of blocks, in which the logical addresses within a given logical address region correspond to column within a group of blocks, in which a first timer signal is used to suspend copying of data from an old group to a new group, and in which a second (optionally different) timer signal is used to suspend the writing of data contained in a WRITE instruction to the flash memory device 9.

Furthermore, in the embodiments above there is only a single NAND flash memory device. However, the invention is not limited in this respect, and there may be more than one NAND flash memory device which is operated according to the principles of the invention described above. For example, each of the NAND memory devices may be associated with a particular respective portion of the logical address space, and there may be a variable mapping for each NAND memory device between blocks of that memory device and respective regions of the corresponding portion of the logical address space.

As mentioned above, the invention may be implemented via a USB connection—although it is not limited in this respect. It is preferred that the USB standard employed by the USB controller is version USB2.0, but the present invention may be implemented with any other versions of the USB standard, such as any versions which are introduced in the future.

The total memory capacity of the device is not limited within the scope of the invention, but is preferably at least 1 Mbyte, and more typically at least 10 Mbytes, at least 100 Mbytes or even at least 1 Gbyte.

The invention claimed is:

1. A portable data storage device operable to write data with reference to a memory address mapping table configured to associate logical address regions with physical address regions, the portable data storage device including:
   (i) a data interface for transferring data packets into and out of the portable data storage device;
   (ii) an interface controller;
   (iii) a master control unit; and
   (iv) a NAND flash memory unit configured to incorporate the physical address regions;
   the interface controller being operable to send data received through the data interface to the master control unit; and
   the master control unit being operable:
   to recognize a data packet received by the data interface as encoding one of a READ instruction indicating a logical address and a WRITE instruction indicating the logical address and data to be written;
   upon receiving the READ instruction, to access the memory address mapping table, to read data from a first physical address of a first physical address region in the NAND flash memory unit, the first physical address corresponding, according to the memory address mapping table, to the logical address, and to transmit to the data interface one or more data packets including the data read; and
   upon receiving the WRITE instruction, to determine, as a first determination, whether the first physical address is in an erased state, and
   when a result of the first determination is affirmative, to write the data to be written to the first physical address, and
   when the result of the first determination is negative:
   (a) to modify the memory address mapping table in accordance with a block queue listing a plurality of queuing physical address regions, the block queue comprising a pointer to indicate a location of a second physical address region at a head of the block queue,
   (b) to locate the second physical address region in accordance with the pointer to thereby associate the second physical address region with the logical address region containing the logical address,
   (c) to write the data to be written to a physical address in the second physical address region, and
   (d) to copy any data stored in other portions of the first physical address region, originally associated with the logical address region containing the logical address, to corresponding locations of the second physical address region,
   (e) to write the location of that first physical address region into the location to which the pointer points, and
   (f) to move the pointer in a round-robin manner to indicate a location of a next one of the plurality of queuing physical address regions in the block queue so that the location of the first physical address is places, following said modification of the memory address mapping table, at a rear of the block queue.

2. The device according to claim 1, wherein the memory address mapping table is stored as mapping data in the NAND flash memory unit, the master control unit being operable to modify the mapping data upon modifying the memory address mapping table.

3. The device according to claim 2, further comprising a memory control address unit operable, upon being initiated, to extract the mapping data from the NAND flash memory unit and to generate the memory address mapping table within RAM memory.

4. The device according to claim 2, wherein a portion of the mapping data defining mapping between a respective physical address region and a logical address region is stored within the respective physical address region.

5. The device according to claim 4, wherein the mapping data relating to the respective physical address region is stored in a control data storage sector of one or more pages of the respective physical address region.

6. The device according to claim 1, wherein the physical address regions listed on the block queue are in the erased state.

7. The device according to claim 1, wherein the device further includes reserved physical address regions which cannot become associated with the logical address under an operation of the master control unit when modifying the memory address mapping table.

8. The device according to claim 1, wherein each physical address region is a respective block of the NAND flash memory unit.

9. The device according to claim 1, wherein the physical address regions comprise groups of blocks in the NAND flash memory unit, the groups being defined according to a grouping table.

10. The device according to claim 9, wherein a majority of the groups of blocks is defined in the NAND flash memory unit according to a rule, and the grouping table defines groups positioned in the NAND flash memory unit according to exceptions to the rule.

11. The device according to claim 10, wherein the memory address mapping table contains a flag for any logical address associated with one of the groups of blocks positioned according to the exceptions to the rule.

12. The device according to claim 9, wherein the master control unit associates consecutively following logical addresses within a logical address region with respective pages in different ones of the blocks.

13. The device according to claim 12, wherein the master control unit associates consecutive logical addresses into sets, each of the sets having a number of members equal to the number of blocks in each group, and for each given set the master control unit associates the logical addresses of the set with corresponding pages of the respective blocks.

14. The device according to claim 1, wherein the master control unit is operable, in response to receiving a first WRITE instruction, to implement the first WRITE instruction only upon determining that, within a predefined period, a second WRITE instruction obeying a predefined similarity criterion is not received.

15. The device according to claim 14, wherein the master control unit is further operable to access a data cache and in response to the first WRITE instruction, and to write the data to the data cache, said similarity criterion being that the second WRITE instruction relates to the same logical address as the first WRITE instruction, and when the similarity criterion is satisfied, to write the data specified in the second WRITE instruction to the data cache.

16. The device according to claim 14, wherein the master control unit is further operable to access a data cache and in response to the first WRITE instruction writes the data to the data cache when the first WRITE instruction relates to one or more selected logical addresses, said similarity criterion being that the second WRITE instruction relates to the same logical address as the first WRITE instruction, and when the similarity criterion is satisfied, to write the data specified in the second WRITE instruction to the data cache.

17. The device according to claim 16, wherein the WRITE instruction relates to a plurality of said selected logical addresses.

18. The device according to claim 16, further including a pattern recognition unit operable to recognize as a high frequency logical address a logical address encoded in WRITE instructions that is received with high frequency, and to set said high frequency logical address as said selected logical address.

19. A portable data storage device operable to write data with reference to a memory address mapping table configured to associate logical address regions with physical address regions, the portable data storage device including:
(i) a data interface for transferring data packets into and out of the portable data storage device;
(ii) an interface controller;
(iii) a master control unit; and
(iv) a NAND flash memory unit configured to incorporate the physical address regions;
the interface controller being operable to send data received through the data interface to the master control unit; and
the master control unit being operable:
to recognize a data packet received by the data interface as encoding one of a READ instruction indicating a logical address and a WRITE instruction indicating the logical address and data to be written;

upon receiving the READ instruction, to access the memory address mapping table, to read data from a first physical address in the NAND flash memory unit corresponding, according to the memory address mapping table, to the logical address, and to transmit to the data interface one or more data packets including the data read; and upon receiving the WRITE instruction, to determine, as a first determination, whether the first physical address is in an erased state, and when a result of the first determination is affirmative, to write the data to be written to the first physical address, and when the result of the first determination is negative:
(a) to modify the memory address mapping table in accordance with a block queue listing one or more queuing physical address regions to thereby associate a second physical address with the logical address, the second physical address belonging to a queuing physical address region at a head of the block queue,
(b) to write the data to be written to the second physical address, and
(c) to copy any data stored in other portions of a first physical address region designated by the first physical address to corresponding locations of a second physical address region designated by the second physical address;

wherein the master control unit is operable, in response to receiving a first WRITE instruction, to implement the first WRITE instruction only upon determining that, within a predefined period, a second WRITE instruction obeying a predefined similarity criterion is not received; and wherein following a modification of the memory address mapping table in relation to a first logical address, and prior to said copying of the data from the first physical address to the second physical address, said similarity criterion is whether the second WRITE instruction relates to a logical address corresponding to a location designated by the first logical address of the data to be copied, and when the similarity criterion is satisfied, aborting said copying operation and instead writing data specified by the second WRITE instruction to the second physical address.

20. A portable data storage device including:
(i) a data interface for transferring data packets into and out of the device,
(ii) an interface controller,
(iii) a master control unit, and
(iv) at least one NAND flash memory unit,
the interface controller being arranged to send data received through the interface to the master control unit, and
the master control unit being arranged to recognize certain data packets as encoding READ instructions and other data packets as encoding WRITE instructions;
(a) upon receiving a READ instruction indicating a logical address, to access a memory address mapping table which associates logical address regions within a logical memory space with respective first physical address regions within the memory unit, to read data from a physical address in the memory unit corresponding to the logical address according to the address mapping table, and to transmit to the data interface one or more data packets including the data which was read; and
(b) upon receiving a WRITE instruction indicating a logical address and data to be written to that logical address, to determine if the physical address corresponding to the logical address according to the memory address mapping table is in the erased state, and:

if so, to write the data to that physical address, or if not, to modify the address mapping table to associate a second physical address region with the logical address region containing the logical address, to write the data to a physical address corresponding to the logical address according to the modified memory address mapping table, and to copy any data stored in other potions of the first physical address region to corresponding locations of the second physical address region;

wherein the master control unit is arranged, in response to receiving a first WRITE instruction, to implement the write instruction only upon determining that, within a predefined period, a second WRITE instruction is not received obeying a predefined similarity criterion; and wherein following a modification of the memory address modification table in relation to a given logical address region, and prior to said copying of the data from the first physical address region to the new second address region, said criterion is whether the second WRITE instruction relates to a logical address corresponding to the location within the given logical address region of the data to be copied, and in the case that such a WRITE instruction is received, aborting said copying operation and instead writing data specified by the second WRITE instruction to the location of the second physical address region.

* * * * *